No. 623,612. Patented Apr. 25, 1899.
H. G. METZIG.
ANIMAL CATCHING AND HOLDING TOOL.
(Application filed Dec. 31, 1898.)
(No Model.)
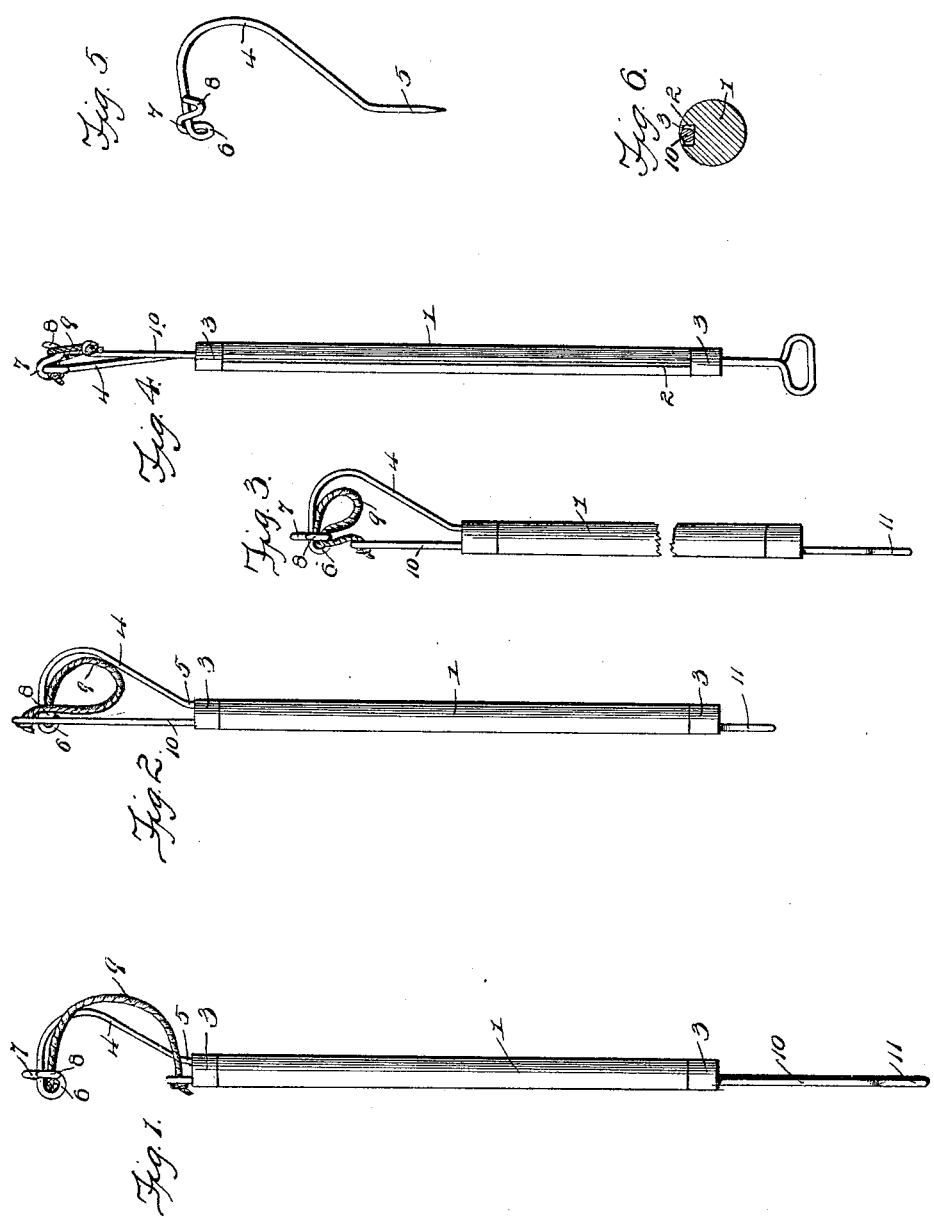

UNITED STATES PATENT OFFICE.

HERMAN G. METZIG, OF BERLIN, WISCONSIN.

ANIMAL CATCHING AND HOLDING TOOL.

SPECIFICATION forming part of Letters Patent No. 623,612, dated April 25, 1899.

Application filed December 31, 1898. Serial No. 700,873. (No model.)

*To all whom it may concern:*

Be it known that I, HERMAN G. METZIG, a citizen of the United States, residing at Berlin, in the county of Green Lake and State of Wisconsin, have invented a new and useful Animal Catching and Holding Tool, of which the following is a specification.

This invention relates to animal catchers or holders; and the object thereof is to provide an implement of this class adapted to be applied to one of the legs of a hog, sheep, calf, or other animal to hold the same for ringing, shearing, or for any desired purpose.

To this end the present invention consists in the combination and arrangement of parts, as will be hereinafter more fully described, and particularly pointed out in the claims.

In the drawings, Figure 1 is a side elevation of the implement in the plane of the bowed arm thereof and in its normal position. Fig. 2 is a similar view showing the implement in one of its adjusted positions. Fig. 3 is a similar view of the implement in another position. Fig. 4 is an elevation of the implement from the grooved side of the handle when the implement is in the position shown in Fig. 3. Fig. 5 is a detail perspective view of the bowed arm. Fig. 6 is a detail cross-sectional view of the handle.

Corresponding parts are designated by like reference characters in all the figures of the drawings.

Referring to the accompanying drawings, 1 designates a handle of suitable length, having a longitudinal groove 2 formed throughout its entire length and ferrules 3 at the ends thereof, protecting the same and covering the respective ends of the grooves. A bowed arm 4, as shown in detail in Fig. 4, is fitted to one end of the handle. This arm is formed from a single length of metal bent into an attaching-shank 5 at one end and the outer end thereof terminating in an eye 6, disposed above the shank and on the other side thereof opposite the bowed arm. The opening of the eye 6 is disposed transversely of the plane of the bowed arm, and its extremity is bent or engaged over the end thereof, as at 7, and formed into a hook or catch 8, extending transversely thereof. The arm thus formed is fitted by means of its shank to one end of the handle 1, with its hook-and-eye end disposed in longitudinal alinement with the handle and upon the grooved side thereof, which spaces the hook and eye beyond the end of the handle and transversely thereof at approximately right angles to the plane of the groove therein. The handle and arm thus assembled provide a support or holder for a flexible band 9, either a chain, rope, or other suitable, strong, and flexible material, which is connected at one end to the eye 6, forming a fixed support therefor, and at its other end to an operating-rod 10. This rod is provided with a suitable handle 11 at its opposite extremity, and the body thereof is slidably mounted in the groove of the handle, being confined therein by the ferrules 3.

In the operation of the implement the rod 10 is first pulled backward, and the band is disposed upon the same side of the handle as is the bowed arm thereof, as shown in Fig. 1, and that end of the rope which is connected to the eye 6 passes between the shank of the hook and the eye, whereby that end of the rope is held rigidly against interference with the loop. The arm is engaged sidewise about one of the legs of an animal by means of the opening between the ends of the arm, and the rod is pushed forward until the movable end of the band is passed beyond the hook 8, as indicated in Fig. 2, and then the sliding rod is drawn backward, which engages the band within the hook and forms a closed loop about the animal's leg, and by drawing tightly upon the rod the loop may be bound about the leg as tightly as desired. Thus the loop is tightly engaged about the leg of the animal, and the end of the rod practically closes the opening of the bowed arm, which holds the animal's leg in a substantially rigid manner and prevents kicking.

It will be noted by reference to Fig. 4 that the bowed arm is inclined outward from the plane of the shank, so as to permit of the sliding rod being pushed or moved alongside of and beyond the eye 6 during the operation of the implement, and the hook 8 is arranged inward from the eye end of the arm to permit of the rod passing the same, as indicated in both Figs. 1 and 2.

By the construction and arrangement of parts as herein described a simple and effective animal catching and holding implement is provided in which the parts are few in number, and all of them are positively connected together which guards against possible loss or derangement thereof and results in a durable device.

Changes in the form, proportion, and minor details of construction and arrangement of parts may be made without departing from the spirit and scope or sacrificing any of the advantages of the present invention.

Having thus described the invention, what is claimed is—

1. In an implement of the class described, the combination with a handle, of a bowed arm, a flexible band or rope having one end fixedly connected with the bowed arm, an operating-rod connected to the movable end of the band or rope, the bowed arm being provided with means with which the rope or band is adapted to be engaged and form a loop which is adapted to embrace one of the legs of an animal, substantially in the manner herein set forth.

2. In an implement of the class described, the combination with a handle, of a bowed arm having a hook, a flexible band or rope having one end fixedly connected to the hook end of the arm, and an operating-rod or the like connected to the movable end of the band or rope and adapted to be operated to engage the band or rope with the hook of the arm and form a loop therein, substantially as and for the purpose set forth.

3. In an implement of the class described, the combination with a handle, of a bowed arm having a hook and fitted to one end of the handle and inclined outwardly from the longitudinal plane thereof, a band or rope fixedly connected to the hook end of the arm and an operating-rod or the like connected to the movable end of the band or rope, whereby the latter may be engaged with the hook to form a loop, substantially as and for the purpose set forth.

4. In an implement of the class described, the combination with a handle, of a bowed arm having an attaching-shank at one end and an eye and a hook at the other end thereof, a band or rope having one end fixedly connected to the eye and extending between the eye and the hook, and an operating-rod or the like connected to the movable end of the band or rope and adapted to be operated to engage the band or rope with the hook and form a loop, substantially as and for the purpose set forth.

5. In an implement of the class described, the combination with a handle, of a bowed arm fitted to one end of the handle, said arm being formed from a single length of material into an attaching-shank at one end, an eye at the other end thereof, and a hook disposed inward from the eye end of the arm, a band or rope having one end fixedly connected to the eye of the arm, and a rod or the like connected to the free end of the band or rope and guided in the handle, whereby the band may be engaged with the hook and form a loop, substantially as and for the purpose set forth.

In testimony that I claim the foregoing as my own I have hereto affixed my signature in the presence of two witnesses.

HERMAN G. METZIG.

Witnesses:
 E. H. METZIG,
 G. A. METZIG.